US012776013B2

(12) United States Patent
Puscasu et al.

(10) Patent No.: US 12,776,013 B2
(45) Date of Patent: Oct. 27, 2026

(54) ANOMALOUS PIXEL PROCESSING USING ADAPTIVE DECISION-BASED FILTER SYSTEMS AND METHODS

(71) Applicant: Teledyne FLIR Defense, Inc., Wilsonville, OR (US)

(72) Inventors: Irina Puscasu, Winchester, MA (US); Yael Steinsaltz, North Billerica, MA (US); Henry A. Kelley, Woburn, MA (US); Charles W. Handley, Santa Barbara, CA (US); Julie R. Moreira, Santa Barbara, CA (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 222 days.

(21) Appl. No.: 18/405,914

(22) Filed: Jan. 5, 2024

(65) Prior Publication Data

US 2024/0242315 A1 Jul. 18, 2024

Related U.S. Application Data

(60) Provisional application No. 63/479,711, filed on Jan. 12, 2023.

(51) Int. Cl.
*G06K 9/00* (2022.01)
*G06T 5/20* (2006.01)
(Continued)

(52) U.S. Cl.
CPC .................. *G06T 5/77* (2024.01); *G06T 5/20* (2013.01); *G06T 7/0002* (2013.01); *G06T 2207/10048* (2013.01); *G06T 2207/30168* (2013.01)

(58) Field of Classification Search
CPC ........... G06T 5/77; G06T 5/20; G06T 7/0002; G06T 2207/10048; G06T 2207/30168
See application file for complete search history.

(56) References Cited

U.S. PATENT DOCUMENTS 6,965,395 B1 * 11/2005 Neter .................. H04N 25/683 348/134
8,577,167 B2 * 11/2013 Chang ....................... G06T 5/70 382/262
(Continued)

FOREIGN PATENT DOCUMENTS

CN 111083401 A * 4/2020 ............. H04N 25/68
CN 111681193 A * 9/2020 ............. G06T 11/10
(Continued)

OTHER PUBLICATIONS

Bad Pixel Replacement Based on Spatial Statistics for IR sensor, Meng Xiang-long et al., SPIE, 2010, pp. 1-6 (Year: 2010).*
(Continued)

*Primary Examiner* — Jayesh A Patel
(74) *Attorney, Agent, or Firm* — Haynes and Boone, LLP

(57) ABSTRACT

Techniques are provided to detect and/or replace anomalous pixels. In one example, a method includes receiving an image frame comprising a plurality of pixels having associated pixel values. The method also includes selecting a kernel of the pixels comprising a center pixel and a plurality of neighbor pixels. The method also includes, if the center pixel value exhibits an anomalous pixel condition, calculating a replacement pixel value using a gradient associated with at least a subset of pixel values of the neighbor pixels. Additional methods and systems are also provided.

20 Claims, 7 Drawing Sheets

(51) Int. Cl.

| | |
|---|---|
| ***G06T 5/77*** | (2024.01) |
| ***G06T 7/00*** | (2017.01) |

(56) References Cited

U.S. PATENT DOCUMENTS

| | | | | |
|---|---|---|---|---|
| 9,208,542 | B2 | 12/2015 | Högasten et al. | |
| 9,235,876 | B2 | 1/2016 | Högasten et al. | |
| 9,237,284 | B2 | 1/2016 | Högasten et al. | |
| 9,292,909 | B2 | 3/2016 | Högasten et al. | |
| 9,756,264 | B2 | 9/2017 | Hoelter et al. | |
| 9,843,742 | B2 * | 12/2017 | Garrow | H04N 23/23 |
| 10,033,944 | B2 | 7/2018 | Högasten et al. | |
| 10,425,603 | B2 * | 9/2019 | Kostrzewa | G06T 5/20 |
| 10,621,702 | B1 * | 4/2020 | Robison | G06T 5/20 |
| 11,012,648 | B2 | 5/2021 | Kostrzewa et al. | |
| 11,915,394 | B2 | 2/2024 | Moreira et al. | |
| 2005/0008251 | A1 * | 1/2005 | Chiang | G06T 5/73 382/266 |
| 2005/0276504 | A1 * | 12/2005 | Chui | G06T 5/20 382/264 |
| 2007/0247532 | A1 * | 10/2007 | Sasaki | G06T 11/10 386/E5.072 |
| 2008/0025630 | A1 * | 1/2008 | Hofman | G06T 5/70 382/260 |
| 2009/0087121 | A1 * | 4/2009 | Han | G06T 5/20 382/266 |
| 2010/0220193 | A1 * | 9/2010 | Hogasten | H04N 23/20 348/E5.09 |
| 2011/0007973 | A1 * | 1/2011 | Kwon | G06T 5/70 382/199 |
| 2011/0194764 | A1 * | 8/2011 | Park | H04N 25/683 382/167 |
| 2012/0075505 | A1 * | 3/2012 | Van Beek | G06T 5/20 348/241 |
| 2013/0022279 | A1 * | 1/2013 | Hogasten | H04N 23/20 382/218 |
| 2013/0028495 | A1 * | 1/2013 | Star-Lack | G06T 12/10 382/131 |
| 2015/0093041 | A1 * | 4/2015 | Kang | G06T 5/70 382/275 |
| 2016/0198102 | A1 * | 7/2016 | Chahine | H04N 17/002 348/164 |
| 2016/0239942 | A1 * | 8/2016 | Usman | G06T 3/40 |
| 2017/0256035 | A1 * | 9/2017 | Takatori | G06F 18/22 |

FOREIGN PATENT DOCUMENTS

| | | | | | |
|---|---|---|---|---|---|
| KR | 20080050059 | A | * | 6/2008 | G06F 13/4282 |
| KR | 100853025 | B1 | * | 8/2008 | G06F 13/4282 |
| KR | 100854722 | B1 | * | 8/2008 | H04N 5/08 |
| KR | 101558532 | B1 | * | 10/2015 | G06T 5/20 |
| KR | 1020170107252 | A | * | 9/2017 | |
| KR | 102247564 | B1 | * | 5/2021 | H04N 25/68 |
| WO | WO-2020010638 | A1 | * | 1/2020 | G06T 7/00 |

OTHER PUBLICATIONS

Pixel density based trimmed median filter for removal of noise from surface image, Bhaskara Rao Jana et al.,Springer, Jun. 2021, pp. 1017-1028 (Year: 2021).*

* cited by examiner

ANOMALOUS PIXEL PROCESSING USING ADAPTIVE DECISION-BASED FILTER SYSTEMS AND METHODS

CROSS REFERENCE TO RELATED APPLICATIONS

This application claims priority to and the benefit of U.S. Provisional Patent Application No. 63/479,711 filed Jan. 12, 2023 and entitled "ANOMALOUS PIXEL PROCESSING USING ADAPTIVE DECISION-BASED FILTER SYSTEMS AND METHODS," which is herein incorporated by reference in its entirety.

TECHNICAL FIELD

The present invention relates generally to image processing and, more particularly, to the processing of anomalous pixels in images.

BACKGROUND

Various types of imaging devices are used to capture images (e.g., image frames) in response to electromagnetic radiation received from desired scenes of interest. Typically, these imaging devices include sensors arranged in a plurality of rows and columns, with each sensor providing a corresponding pixel of a captured image frame, and each pixel having an associated pixel value corresponding to the received electromagnetic radiation.

One or more pixels may exhibit anomalous behavior due to problems with gain calibration, sensor defects, manufacturing tolerances, and/or other causes. Such anomalous pixels may have unusually high or low pixel values that appear as "salt and pepper noise." Various techniques have been developed to identify and replace the values of such anomalous pixels. For example, in some cases, the values of other nearby pixels in an image may be processed and used to replace the value of an anomalous pixel. However, such techniques may fail to account for some related consequences of the anomalous pixel.

SUMMARY

Methods and systems for anomalous pixel processing are provided using adaptive decision-based filtering techniques. In some cases, replacement pixel values may be calculated using average pixel values of selected neighbor pixels of a kernel to reduce the effects of cross-talk on replacement pixel values where appropriate. In other cases, replacement pixel values may be calculated using a mean pixel value of the kernel where appropriate. In addition, offset values may be added to the replacement pixel values to further reduce the effects of cross-talk. Additional techniques are further discussed herein.

In one embodiment, a method includes receiving an image frame comprising a plurality of pixels having associated pixel values; selecting a kernel of the pixels comprising a center pixel and a plurality of neighbor pixels; and if the center pixel value exhibits an anomalous pixel condition, calculating a replacement pixel value using a gradient associated with at least a subset of pixel values of the neighbor pixels.

In another embodiment, a system includes a logic device configured to: receive an image frame comprising a plurality of pixels having associated pixel values; select a kernel of the pixels comprising a center pixel and a plurality of neighbor pixels; and if the center pixel value exhibits an anomalous pixel condition, calculate a replacement pixel value using a gradient associated with at least a subset of pixel values of the neighbor pixels.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with embodiments disclosed herein, various techniques are provided to detect and replace anomalous pixel values in captured image frames. Such image frames may be captured in response electromagnetic radiation (e.g., irradiance) at one or more wavebands, such as thermal infrared, near infrared, short wave infrared, mid wave infrared, long wave infrared, visible light, and/or other wavelength ranges received from a scene.

In some embodiments, a pixel exhibiting an anomalous pixel value (e.g., also referred to as an impulse) may be detected and/or replaced by processing the pixel values of neighboring pixels residing in a kernel that includes the pixel under review. For example, in some embodiments, the pixel under review may be a center pixel in a 3 pixel by 3 pixel kernel, however other kernel sizes may be used as appropriate (e.g., a 3 pixel by 3 pixel kernel may provide advantages in utilization of hardware processing resources in some embodiments). Moreover, the center pixel is not required to be in the precise or exact center of the kernel in all embodiments (e.g., in the case of kernels with one or more even numbered dimensions).

As further discussed herein, various techniques are provided that selectively utilize an average pixel value of selected neighbor pixels and/or a median pixel value of the kernel to provide improved pixel replacement values for high and low anomalous pixel values which may benefit from different replacement value calculations. In particular, such techniques can reduce the effects of cross-talk between pixels when calculating the replacement pixel value. In addition, the replacement pixel value may include a high or low offset to compensate for small amounts of cross-talk that may be present in neighbor pixels. Selectively adjustable (e.g., floating) high value and low value thresholds (e.g., which may be the same or different from each other) may also be used to detect anomalous pixel values and determine whether pixel value replacement is appropriate. These and other features are further discussed herein.

Figure 1:
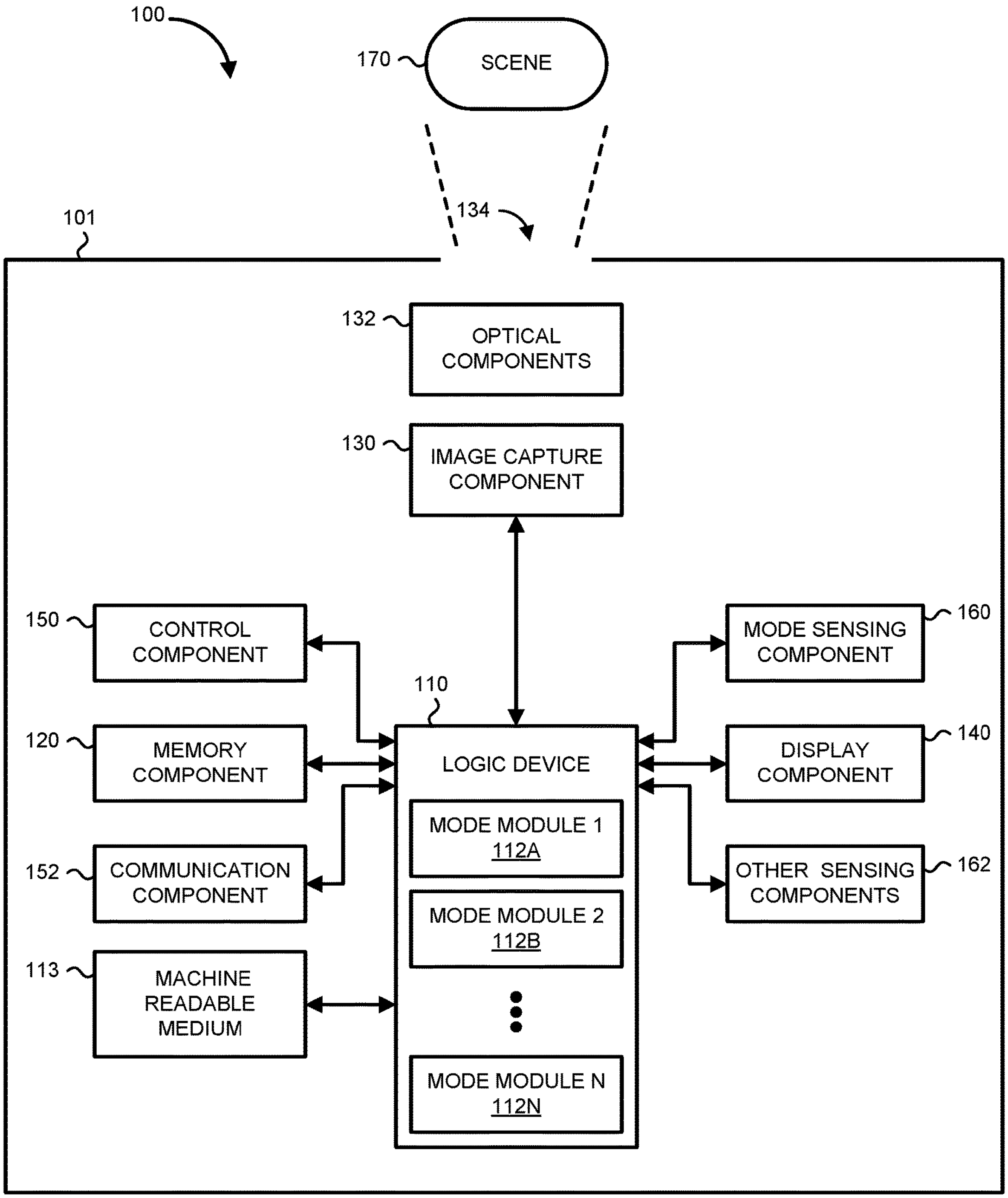
FIG. 1 illustrates a block diagram of an imaging system in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a logic device 110, a memory component 120, an image capture component 130, optical components 132 (e.g., one or more lenses configured to receive electromagnetic radiation through an aperture 134 in housing 101 and pass the electromagnetic radiation to image capture component 130), a display component 140, a control component 150, a communication component 152, a mode sensing component 160, and a sensing component 162.

In various embodiments, imaging system 100 may implemented as an imaging device, such as a camera, to capture image frames, for example, of a scene 170 (e.g., a field of view). Imaging system 100 may represent any type of camera system which, for example, detects electromagnetic radiation (e.g., irradiance) and provides representative data (e.g., one or more still image frames or video image frames). For example, imaging system 100 may represent a camera that is directed to detect one or more ranges (e.g., wavebands) of electromagnetic radiation and provide associated image data. In some embodiments, imaging system 100 may include a portable device. In some embodiments, imaging system 100 may be implemented as a handheld device. In some embodiments, imaging system 100 may be a non-portable and/or non-handheld device. In some embodiments, imaging system 100 may be attached to a gimbal and/or other mechanism, device, or structure. In some embodiments, imaging system 100 may be coupled to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another embodiment, imaging system 100 may be integrated as part of a non-mobile installation to provide image frames to be stored and/or displayed.

Logic device 110 may include, for example, a microprocessor, a single-core processor, a multi-core processor, a microcontroller, a programmable logic device (e.g., a field programmable logic device (FPGA)), and/or other device configured to perform processing operations, a digital signal processing (DSP) device, one or more memories for storing executable instructions (e.g., software, firmware, or other instructions), and/or or any other appropriate combination of processing device and/or memory to execute instructions to perform any of the various operations described herein. Logic device 110 is adapted to interface and communicate with components 120, 130, 140, 150, 160, and 162 to perform method and processing steps as described herein. Logic device 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in logic device 110 or stored on memory component 120 for access and execution by logic device 110. In another aspect, logic device 110 may be adapted to perform various types of image processing techniques as described herein.

In various embodiments, it should be appreciated that each mode module 112A-112N may be integrated in software and/or hardware as part of logic device 110, or code (e.g., software or configuration data) for each mode of operation associated with each mode module 112A-112N, which may be stored in memory component 120. Embodiments of mode modules 112A-112N (i.e., modes of operation) disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored mode modules 112A-112N provided to imaging system 100 by coupling the machine readable medium 113 to imaging system 100 and/or by imaging system 100 downloading (e.g., via a wired or wireless link) the mode modules 112A-112N from the machine readable medium (e.g., containing the non-transitory information). In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, logic device 110 is adapted to execute software stored in memory component 120 and/or machine-readable medium 113 to perform various methods, processes, and modes of operations in manner as described herein.

Image capture component 130 includes, in one embodiment, one or more sensors (e.g., any type of thermal infrared, near infrared, short wave infrared, mid wave infrared, long wave infrared, visible light, and/or other type of detector, including a detector implemented as part of a focal plane array) for capturing image signals representative of an image of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Logic device 110 may be adapted to receive image signals from image capture component 130, process image signals (e.g., to provide processed image data), store image signals or image data in memory component 120, and/or retrieve stored image signals from memory component 120. Logic device 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Logic device 110 may be adapted to display image data and information on display component 140. Logic device 110 may be adapted to retrieve image data and information from memory component 120 and display any retrieved image data and information on display component 140. Display component 140 may include display electronics, which may be utilized by logic device 110 to display image data and information. Display component 140 may receive image data and information directly from image capture component 130 via logic device 110, or the image data and information may be transferred from memory component 120 via logic device 110.

In one embodiment, logic device 110 may initially process a captured thermal image frame and present a processed image frame in one mode, corresponding to mode modules 112A-112N, and then upon user input to control component 150, logic device 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and logic device 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Logic device 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to logic device 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electromechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to logic device 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to logic device 110. Alternatively or in addition, as discussed herein for one or more embodiments, a user may provide a user input via control component 150 (e.g., a wireless touch screen of display component 140) to designate the desired mode (e.g., application) of imaging system 100.

Logic device 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to logic device 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to logic device 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to logic device 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques. In some embodiments, other sensing components 162 may include one or more motion and/or location sensors (e.g., accelerometers, gyroscopes, micro-electromechanical system (MEMS) devices, and/or others as appropriate).

In various embodiments, components of imaging system 100 may be combined and/or implemented or not, as desired or depending on application requirements, with imaging system 100 representing various operational blocks of a system. For example, logic device 110 may be combined with memory component 120, image capture component 130, display component 140, and/or mode sensing component 160. In another example, logic device 110 may be combined with image capture component 130 with only certain operations of logic device 110 performed by circuitry (e.g., a processor, a microprocessor, a microcontroller, a logic device, or other circuitry) within image capture component 130. In still another example, control component 150 may be combined with one or more other components or be remotely connected to at least one other component, such as logic device 110, via a wired or wireless control device so as to provide control signals thereto.

In some embodiments, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
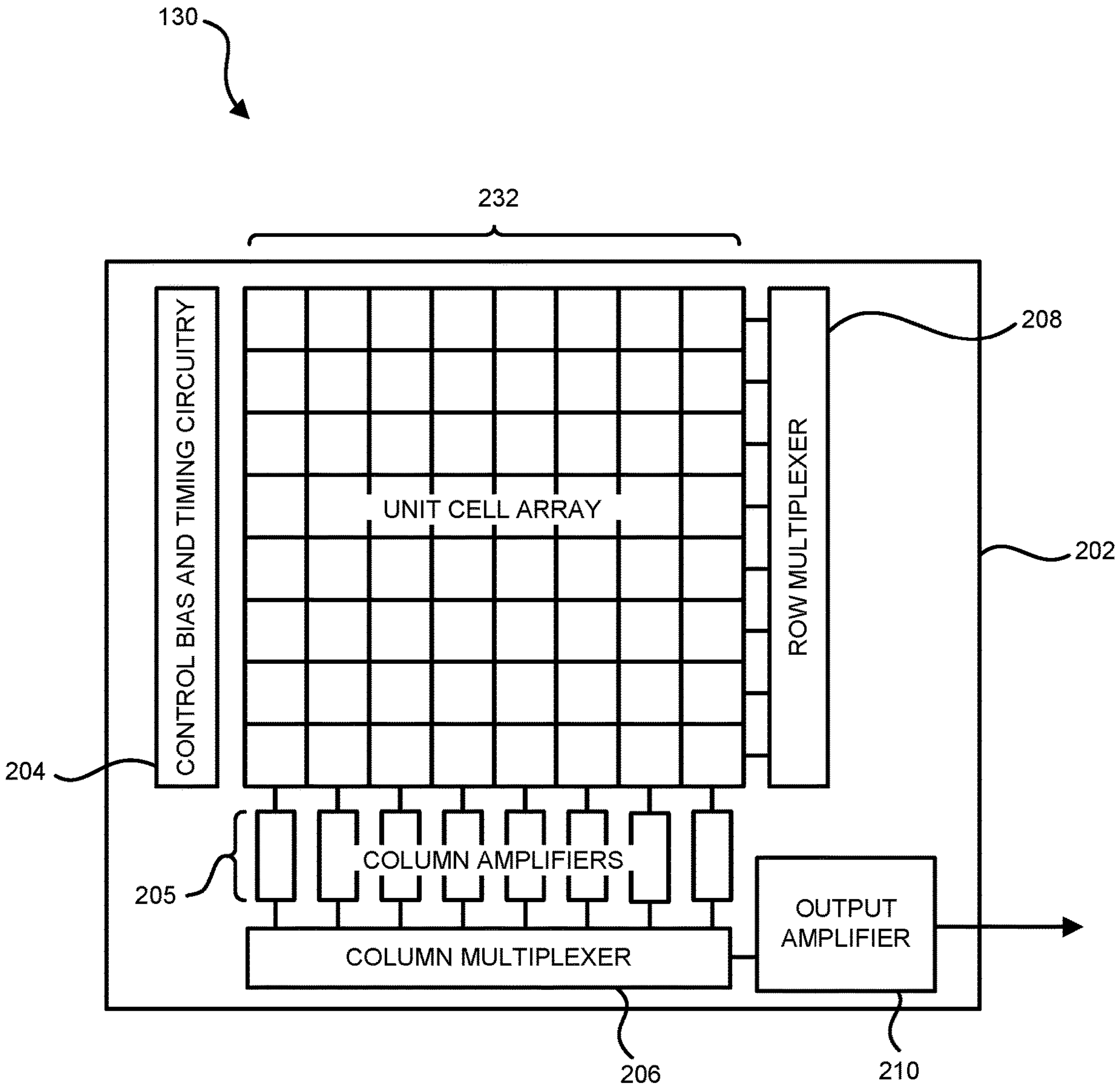
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a thermal imager implemented as a focal plane array (FPA) including an array of unit cells 232 (e.g., sensors) and a read out integrated circuit (ROIC) 202. Each unit cell 232 may be provided with an infrared detector (e.g., a microbolometer, indium antimonide (InSb) sensor, multilayer sensor, or other appropriate cooled or uncooled sensor) and associated circuitry to provide image data for a pixel of a captured thermal image frame. In this regard, time-multiplexed electrical signals may be provided by the unit cells 232 to ROIC 202.

For example, in some embodiments, such sensors may be cooled sensors, high operating temperature (HOT) cooled sensors (e.g., operating at or near 120 degrees K), or uncooled sensors. In some embodiments, anomalous pixels may be more likely in HOT cooled sensors or uncooled sensors than conventional cooled sensors (e.g., InSb sensors). Accordingly, the various embodiments disclosed herein are particularly advantageous in implementations employing HOT cooled sensors or uncooled sensors.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to logic device 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000 which is incorporated by reference herein in its entirety.

Figure 3:
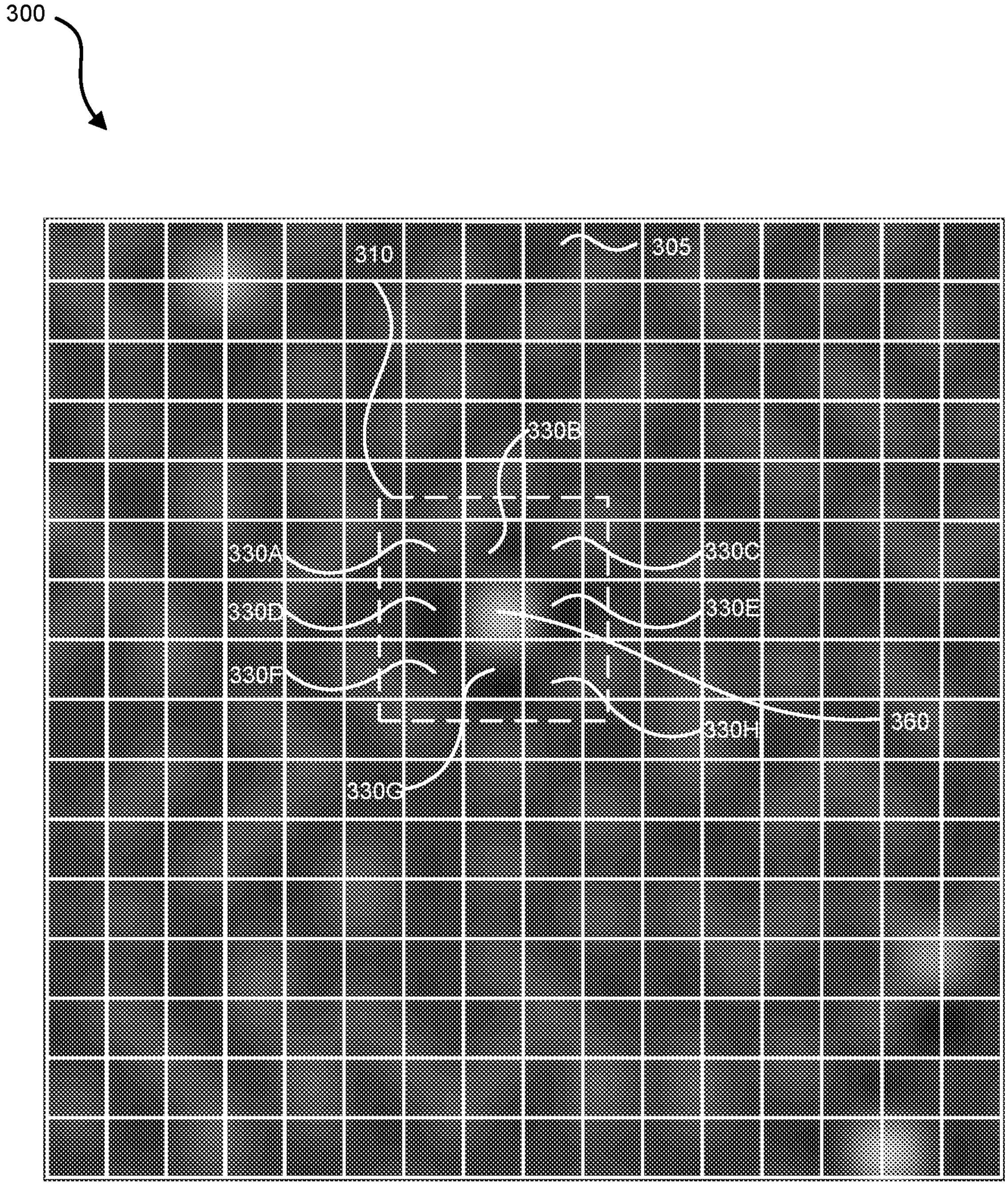
FIG. 3 illustrates an image frame in accordance with an embodiment of the disclosure.

FIG. 3 illustrates an image frame 300 provided by image capture component 130 in accordance with an embodiment of the disclosure. Although image frame 300 is represented as a 16 by 16 pixel image frame, any desired size may be used. Moreover, image frame 300 may be a single captured image frame, a temporally filtered image frame (e.g., resulting from one or more successive image frames combined together), a frame from a video, and/or other implementation as appropriate.

As shown, image frame 300 includes a plurality of pixels 305 arranged in columns and rows. In accordance with anomalous pixel detection techniques discussed herein, various groups (e.g., neighborhoods) of pixels may be identified, also referred to as kernels. For example, FIG. 3 identifies a 3 by 3 pixel kernel 310 comprising a grid of pixels 305 having a center pixel 360 and 8 neighbor pixels 330A-H. Although a particular kernel size of 3 by 3 is shown, other kernel sizes (e.g., 4 by 4, 5 by 5, and/or others) may be used in any embodiments discussed herein as appropriate. In some embodiments, a kernel size of 3 by 3 may be used to facilitate efficient processing by logic device 110 when implemented as an FPGA. In some embodiments, partial kernel sizes may be used where appropriate (e.g., when center pixel 360 is on or close to the edge of image frame 300, kernel 360 may not fully surround center pixel 260).

As discussed, the present disclosure provides various techniques to identify pixels exhibiting anomalous behavior in captured image frames (e.g., image frame 300). Such anomalous behavior may be caused, for example, by defects, calibration errors, cross-talk, nonlinear behavior, and/or other problems with the particular unit cell 232 within the FPA that is associated with the anomalous pixel. Such anomalous behavior may be exhibited, for example, by center pixel 360 exhibiting a pixel value that is outside an expected range of values when compared to the neighbor pixels 330 of kernel 310.

In some implementations, an anomalous pixel may affect other nearby pixels. For example, if a particular unit cell 232 exhibits a defect that results in an anomalous pixel value associated with center pixel 360, this may affect (e.g., skew) the pixel values of one or more of neighbor pixels 330A-H as a result of cross-talk between various pixels (e.g., between the circuits of the pixels' corresponding unit cells 232).

Image frame 300 further illustrates cross-talk between several pixels of kernel 310. For example, center pixel 360 exhibits an anomalous high pixel value that appears bright in image frame 300. As also shown in FIG. 3, the first order neighbor pixels 330B, 330D, 330E, and 330G (e.g., the vertically and horizontally adjacent neighbor pixels) exhibit anomalous low pixel values that appear dark in image frame 300. The second order neighbor pixels 330A, 330C, 330F, and 330H (e.g., the diagonally adjacent neighbor pixels) exhibit only slightly lower pixel values in image frame 300 in a manner that is less anomalous than the first order neighbor pixel values.

In this case, unit cells 232 associated with neighbor pixels 330B, 330D, 330E, and 330G that are vertically and horizontally adjacent to center pixel 360 are affected by the anomalous behavior of the unit cell 232 associated with center pixel 360 more than the pixel values of the diagonally adjacent neighbor pixels 330A, 330C, 330F, and 330H are not affected. Third order neighbor pixels (e.g., pixels that are not adjacent to center pixel 360 in larger kernels of 4 by 4, 5 by 5, or other sizes) are even less affected and may be used to calculate replacement pixel values in some embodiments.

In some embodiments, this behavior may be caused by cross-talk between one or more unit cells 232 of the array. Such cross talk may result from various sources, such as electromagnetic fields passed (e.g., through air when components are physically and electrically isolated from each other and/or through physical connections when components are partially or completely in contact with each other) between one or more of unit cells 232 and/or various circuitry of image capture component 130.

For example, adjacent circuits of unit cells 232 in the same row or same column as the unit cell 232 associated with center pixel 360 may exhibit substantial cross-talk that greatly affects the first order neighbor pixels, namely vertically and horizontally adjacent neighbor pixels 330B, 330D, 330E, and 330G. For example, in some embodiments, operation of the particular unit cell 232 associated with center pixel 360 (e.g., which may exhibit a high pixel value with an unusually bright appearance) may affect the operation of the unit cells 232 associated with first order neighbor pixels 330B, 330D, 330E, and 330G (e.g., which may exhibit low pixel values with unusually dark appearances). Additional variations in the pixel values illustrated in FIG. 3 may be attributed to noise, scene information, and/or both.

As further discussed herein, various techniques are provided to account for the effects of such cross-talk in first order neighbor pixels 330B, 330D, 330E, and 330G when replacing the value of anomalous center pixel 360.

Figure 4:
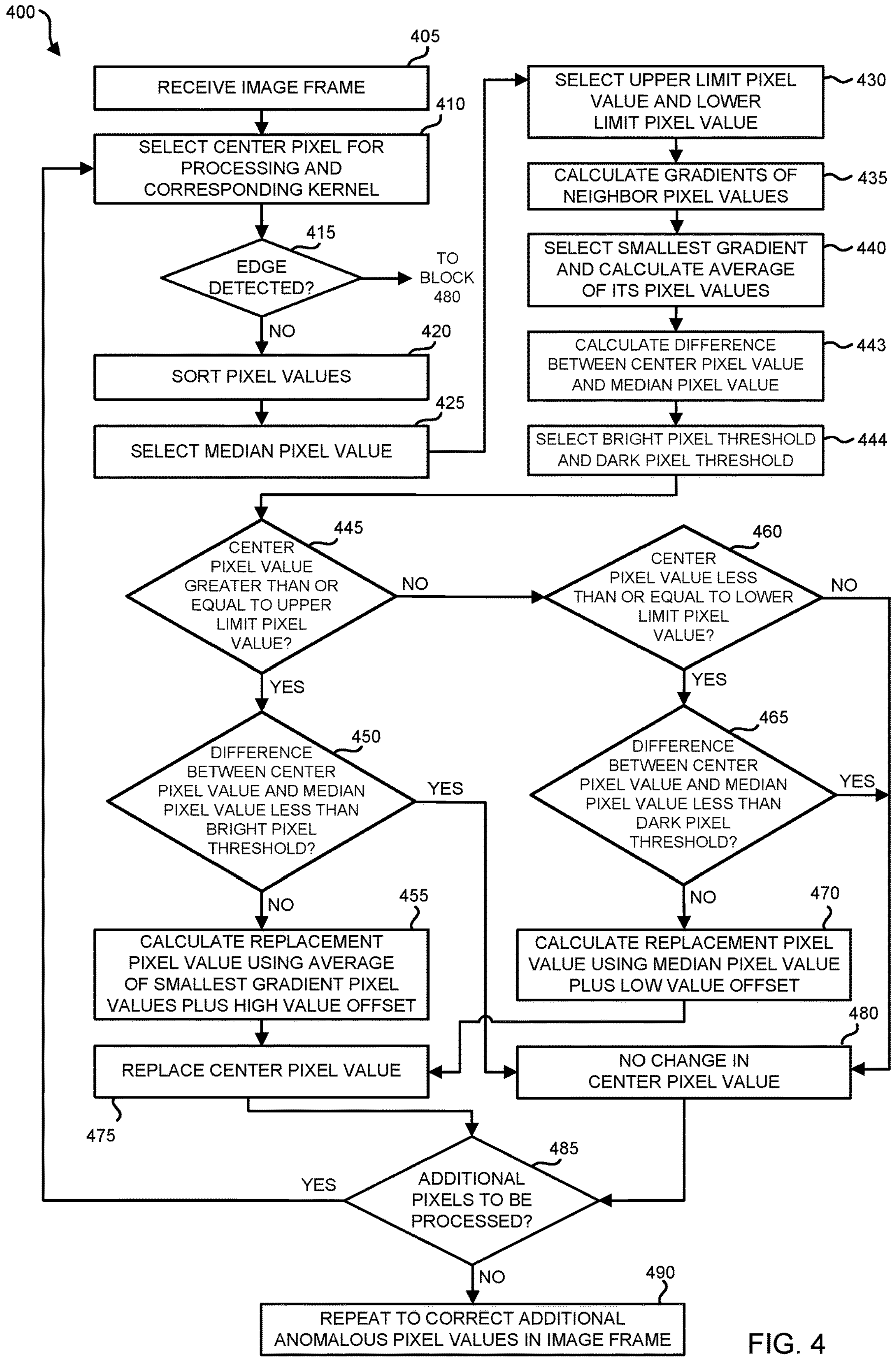
FIG. 4 illustrates a process of performing anomalous pixel processing in accordance with an embodiment of the present disclosure.

FIG. 4 illustrates a process of performing anomalous pixel processing in accordance with an embodiment of the present disclosure. In some embodiments, the process of FIG. 4 may be performed by logic device 110 of imaging system 100, such as an image processing pipeline provided by logic device 110. In some embodiments, the process of FIG. 4 may be performed during runtime operation of imaging system 100 to permit detection, correction, and/or replacement of anomalous pixels which may be performed in real-time, frame-by-frame, selected frames (e.g., every other frame or other intervals), in post-processing (e.g., with corresponding latency), and/or otherwise.

Although the blocks of FIG. 4 are illustrated in a particular order, this arrangement is not limiting. Any of the various blocks of FIG. 4 may be reordered, omitted, and/or otherwise modified as appropriate in particular implementations (e.g., to reduce the processing resources of logic device 110 utilized to perform the process of FIG. 4).

Moreover, the blocks of FIG. 4 may be positioned prior to or after any other processing that may be performed by logic device 110. For example, FIG. 4 may operate on raw captured image frames, normalized image frames, corrected image frames, and/or others as appropriate. For example, in some cases, the blocks of FIG. 4 may be positioned as post-processing to correct anomalous pixel values that are not otherwise corrected by upstream processing. In other cases, the blocks of FIG. 4 may be positioned as pre-processing to correct anomalous pixel values before additional processing is performed. In yet other cases, the blocks of FIG. 4 may be positioned as intermediate processing between earlier and later processes.

In various embodiments, the process of FIG. 4 may be used to filter (e.g., process) the pixel values of image frame 300 by identifying and replacing anomalous pixel values in an adaptive manner by selectively deciding to apply different techniques to anomalous high pixel values and anomalous low pixel values. Such techniques are further discussed herein and include, for example, the use of different upper and lower limit pixel values, different bright pixel and dark pixel thresholds, and different replacement value calculations (e.g., using average values of selected neighbor pixels in some cases and median kernel values in other cases). Although replacement of both anomalous high pixel values and anomalous low pixel values are discussed, in some embodiments only anomalous high pixel values or anomalous low pixel values are detected and/or replaced.

In block 405, logic device 110 receives image frame 300 from image capture component 130 (e.g., image capture component 130 may capture image frame 300 and/or logic device 110 may perform pre-processing to provide image frame 300 in one or more earlier blocks not shown in FIG. 4). As discussed, image frame 300 may be a single captured image frame, a temporally filtered image frame, a frame from a video, and/or other implementation.

In block 410, logic device 110 selects a center pixel and a corresponding kernel (e.g., neighborhood of pixels) of image frame 300 for anomalous pixel processing. In the present discussion, center pixel 360 is selected for processing (e.g., pixel 360 is used as a center pixel with corresponding kernel 310). However, it will be appreciated that any pixel 305 of image frame 300 may be selected as a center pixel with its corresponding kernel, and that blocks 410 through 480 may be repeated to iterate through selection and processing of any or all pixels 305 of image frame 300. As discussed, the selected center pixel is not required to be in the precise or exact center of the kernel in all embodiments (e.g., in the case of kernels with one or more even numbered dimensions).

In block 415, logic device 110 performs edge detection processing on the pixels of kernel 310. In this regard, logic device 110 may detect whether the pixel values of kernel 310 exhibit characteristics associated with a feature (e.g., edge) associated with scene 170 that may be otherwise incorrectly interpreted as an anomalous value of center pixel 360. For example, if an imaged feature of scene 170 is manifested as an edge or line in kernel 310 that is three pixels wide (e.g., an edge or line extending through pixels 330A/360/330H, 330B/360/330G, 330C/360/330F, and/or 330D/360/330E), then the value of center pixel 360 will be deemed normal (e.g. not anomalous) in block 415 and the process of FIG. 4 will continue to block 480 where no change is made to the value of center pixel 360. Otherwise, the process continues to block 420.

In block 420, logic device 110 sorts (e.g., orders) the pixel values associated with the pixels of kernel 360. In this regard, the nine pixels 330A-H and 360 of kernel 310 may have a variety of different pixel values each corresponding to, for example, an intensity associated with electromagnetic radiation received from scene 170 and/or an anomalous value. Accordingly, in block 420, logic device sorts these pixel values.

Figure 5:
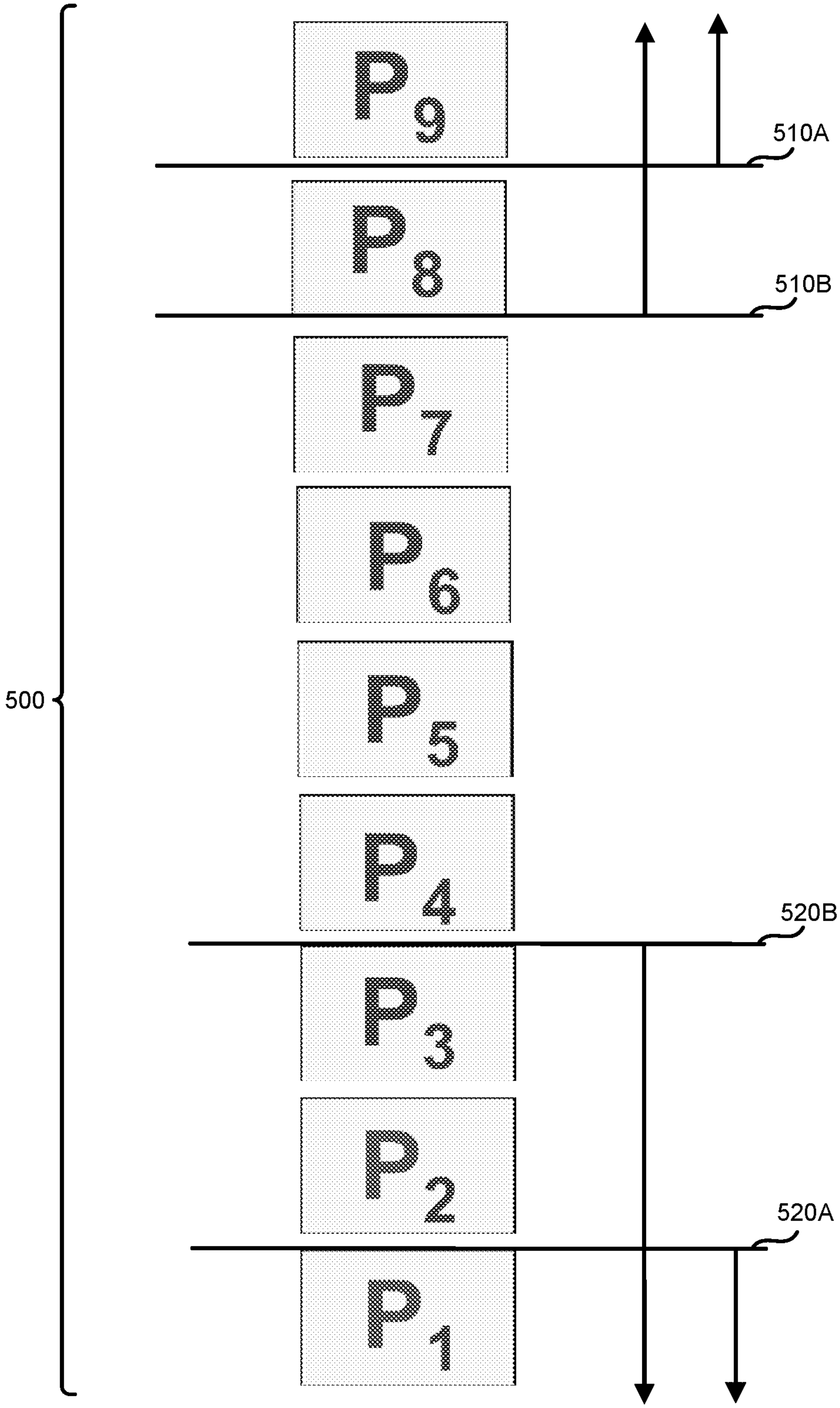
FIG. 5 illustrates an ordering of pixel values in accordance with an embodiment of the present disclosure.

For example, FIG. 5 illustrates 9 different pixel values 500 labeled P1 to P9, any of which may be associated with any of the nine pixels 330A-H and 360 of kernel 310. Thus, in FIG. 9, pixel value P1 corresponds to the lowest pixel value of kernel 310 and pixel value P9 corresponds to the highest pixel value of kernel 310. Although pixel values 500 are sorted in ascending order in this example, descending order may be used in other embodiments. The ordering of pixel values 500 performed in block 420 may be used in the processing of various blocks of FIG. 4 as discussed herein.

In block 425, logic device 110 selects (e.g., identifies) a median pixel value of the sorted pixel values 500 which may be used in the processing of various blocks of FIG. 4. For example, in the embodiment illustrated in FIG. 5, pixel value P5 (e.g., which may be associated with any of the nine pixels 330A-H and 360 of kernel 310) is selected.

In block 430, logic device 110 selects (e.g., identifies) upper and lower limit pixel values that may be used in the processing of various blocks of FIG. 4. For example, in one embodiment, the highest pixel value P9 may be selected as an upper limit pixel value 510A and the lowest pixel value P1 may be selected as a lower limit pixel value 520A. In another embodiment, an intermediate pixel value P8 may be selected as an upper limit pixel value 510B and another intermediate pixel value P3 may be selected as a lower limit pixel value 520B. Indeed, any of the pixel values P1 to P9 may be selected as upper or lower pixel value limits in various embodiments.

In this regard, the selection of various upper and lower limit pixel values may result in more aggressive or less aggressive detection of anomalous pixel values. For example, selecting upper and lower limit pixel values closer to the median pixel value P5 (e.g., upper limit pixel value 510B and lower limit pixel value 520B) may result in more aggressive detection of center pixel 360 as an anomalous pixel e.g., in blocks 445 and 460 further discussed herein. Conversely, selecting upper and lower limit pixels further from the median pixel value P5 (e.g., upper limit pixel value 510A and lower limit pixel value 520A) may result in less aggressive detection of center pixel 360 as an anomalous pixel in blocks 445 and 460 further discussed herein.

In block 435, logic device 110 calculates gradients of various sets of neighbor pixels of kernel 360. As discussed, kernel includes center pixel 360 and neighbor pixels 330A-H. These neighbor pixels 330A-H include first order neighbor pixels 330B, 330D, 330E, and 330G (e.g., vertically and horizontally adjacent to center pixel 360) and second order neighbor pixels 330A, 330C, 330F, and 330H (e.g., diagonally adjacent to center pixel 360).

In block 435, logic device 110 calculates the gradients (e.g., absolute value of the difference between pixel values) exhibited by various sets of neighbor pixels 330A-H. For example, in some embodiments, logic device may calculate the gradient exhibited by first order neighbor pixels 330B and 330G, the gradient exhibited by first order neighbor pixels 330D and 330E, the gradient exhibited by second order neighbor pixels 330A and 330H, and the gradient exhibited by second order neighbor pixels 330C and 330F. In other embodiments, only the gradients exhibited by the second order neighbor pixels may be calculated.

In some embodiments, the gradients can be determined by calculating the absolute values of the difference between the associated pixel values as set forth in the following equations 1A to 2B:

$$\text{gradient } 1 = \text{abs}[(\text{pixel value } 330B) - (\text{pixel value } 330G)] \quad \text{(eq. 1A)}$$

$$\text{gradient } 2 = \text{abs}[(\text{pixel value } 330D) - (\text{pixel value } 330E)] \quad \text{(eq. 1B)}$$

$$\text{gradient } 3 = \text{abs}[(\text{pixel value } 330A) - (\text{pixel value } 330H)] \quad \text{(eq. 2A)}$$

$$\text{gradient } 4 = \text{abs}[(\text{pixel value } 330C) - (\text{pixel value } 330F)] \quad \text{(eq. 2B)}$$

In block 440, logic device 110 selects the smallest of the gradients calculated in block 435 and calculates the average of the subset of the neighbor pixel values associated with the selected gradient (e.g., in the case of a 3 pixel by 3 pixel kernel, the subset is the two pixel values of neighbor pixels 330B and 330G, 330D and 330E, 330A and 330H, or 330C and 330F). In some embodiments, this can be performed as set forth in the following equations 3A to 4B:

$$\text{average for gradient } 1 = [(\text{pixel value } 330B) + (\text{pixel value } 330G)]/2 \quad \text{(eq. 3A)}$$

$$\text{average for gradient } 2 = [(\text{pixel value } 330D) + (\text{pixel value } 330E)]/2 \quad \text{(eq. 3B)}$$

$$\text{average for gradient } 3 = [(\text{pixel value } 330A) + (\text{pixel value } 330H)]/2 \quad \text{(eq. 4A)}$$

$$\text{average for gradient } 4 = [(\text{pixel value } 330C) + (\text{pixel value } 330F)]/2 \quad \text{(eq. 4B)}$$

It will be appreciated that gradients 1 and 2 are effectively measurements of the pixel value changes exhibited in the vertical and horizontal directions of kernel 360, and that gradients 3 and 4 are effectively measurements of the pixel value changes exhibited in the diagonal directions of kernel 360. In some embodiments, calculating a replacement pixel value for center pixel 360 using the average of the pixel values associated with the smallest gradient (e.g., in block 455 further discussed herein), may result in improved image quality with less visible processing artifacts.

In some embodiments, only the diagonal second order neighborhood pixel values are used in blocks 435, 440, and 455 (e.g., only gradients 3 and 4 are considered in such cases). Such an approach can reduce the effects of cross-talk exhibited by the vertical and horizontal first order neighborhood pixel values on the calculated replacement pixel value.

In block 443, logic device 110 calculates a difference between the pixel value of center pixel 360 and the median pixel value P5 (e.g., identified in FIG. 5) for use in detecting anomalous pixel values in comparison to various thresholds as further discussed herein. In some embodiments, the difference can be determined by calculating the absolute value of the difference between the pixel value of center pixel 360 and the median pixel value P5 as set forth in the following equation 5:

$$\text{difference} = \text{abs}[(\text{median pixel value } P5) - (\text{pixel value } 360)] \quad \text{(eq. 5)}$$

In block 444, logic device selects a bright pixel threshold (e.g., distinguishable from the upper limit pixel value previously discussed herein) and a dark pixel threshold (e.g., distinguishable from the lower limit pixel value previously discussed herein). Such thresholds can be used as part of the process to detect anomalous high pixel values and anomalous low pixel values as further discussed herein with regard to blocks 450 and 465.

In blocks 445 to 455, logic device performs various processing to detect whether center pixel 360 has an anomalous high pixel value and calculate a replacement pixel value if appropriate. In blocks 460 to 470, logic device performs various processing to detect whether center pixel 360 has an anomalous low pixel value and calculate a replacement pixel value if appropriate.

Turning first to the case of a possible anomalous high pixel value, in block 445, logic device 110 compares the pixel value of center pixel 360 with the upper limit pixel value determined in block 430. In this regard, if center pixel 360 has a pixel value greater than or equal to the upper limit pixel value (e.g., P9 in the case of upper limit pixel value 510A, P8 in the case of upper limit pixel value 510B, or other upper limits that may be selected), then center pixel 360 is preliminarily identified as a possible anomalous high pixel value and the process continues to block 450. Otherwise, the process continues to block 460.

In various embodiments, the determination of an anomalous high pixel value can be further performed through the use of a bright pixel threshold (e.g., distinguishable from the upper limit pixel values previously discussed herein). In this regard, the bright pixel threshold may be an adjustable threshold that is used as a further check to determine whether center pixel 360 exhibits an anomalous high pixel value.

Accordingly, in block 450, logic device 110 compares the difference previously determined in block 443 (e.g., the between the pixel value of center pixel 360 and the median pixel value P5) with a bright pixel threshold. In this regard, it will be appreciated that if the pixel value of center pixel 360 greatly deviates from the median pixel value P5 (e.g., their difference exceeds the bright pixel threshold), then it is likely to be anomalous and the process continues to block 455. Conversely, if the pixel value of center pixel 360 is close to the median pixel value P5 (e.g., their difference is less than the bright pixel threshold), then it is unlikely to be anomalous and the process continues to block 480.

Upon reaching block 455, logic device 110 will have determined that center pixel 360 is indeed an anomalous high pixel value (e.g., as a result of the determinations performed in blocks 445 and 450). Accordingly, in block 455, logic device calculates a replacement pixel value for center pixel 360. In this case, logic device 110 may use the average determined in block 440 and may further include a high value offset as set forth in the following equation 6:

$$\text{replacement pixel value} = (\text{average for gradient } 1, 2, 4, \text{ or } 4) + (\text{high value offset}) \quad \text{(eq. 6)}$$

It will be appreciated that the averages for gradients 1 to 4 corresponds to the results of equations 3A to 4A determined in block 440. As discussed, in some embodiments, all of gradients 1 to 4 may be considered (e.g., the replacement pixel value may be based on first order neighbor pixel values or second order neighbor pixel values).

As also discussed, in some embodiments, only gradients 3 and 4 may be considered (e.g., the replacement pixel value may be based on only second order neighbor pixel values corresponding to the smallest of gradient 3 or gradient 4 selected in block 440). As discussed, gradients 3 and 4 are the average of the second order neighbor pixels (e.g., pixels 330A and 330H, and pixels 330C and 330F) having the smallest difference between each other. As also discussed and further illustrated in FIG. 3, the second order neighbor pixels 330A, 330C, 330F, and 330H exhibit substantially less cross-talk effects than the first order neighbor pixels 330B, 330D, 330E, and 330G. This is particularly the case when center pixel 360 has an anomalous high pixel value as shown in FIG. 3.

Thus, by calculating the replacement pixel value for an anomalous high pixel value using the second order neighbor pixels in some cases (e.g., rather than using all neighbor pixels of kernel 360 as in other cases), a more accurate replacement pixel value may be provided (e.g., the replacement pixel value will not be abnormally pulled low by the low pixel values of the first order neighbor pixels 330B, 330D, 330E, and 330G. Moreover, by using the average of the second order neighbor pixels having the smaller gradient may result in improved image quality with less visible processing artifacts as discussed.

Although block 455 has been discussed with regard to using an average of neighbor pixel values to calculate the replacement pixel value, other techniques may be used as appropriate. For example, in some embodiments, the median value P5 determined in block 425 may be used instead of the average. This can be particularly useful in cases where the pixel values of kernel 310 are distributed in a substantially uniform manner. In other embodiments, an average of all neighbor pixels may be used.

As set forth in equation 6, a high value offset may be added to the replacement pixel value. This can be provided to compensate for small cross-talk effects that may be present in any of the neighbor pixels. In this regard, although the second order neighbor pixels exhibit less cross-talk effects than the first order neighbors, it can be beneficial in some embodiments to further compensate for these minor effects that may be present in the pixel values of any of the neighbors (e.g., the first and/or second order neighbors) that are used to calculate the replacement pixel value.

In some embodiments, the high value offset may be a fraction of the highest pixel value P9 of kernel 310. In this regard, it will be appreciated that P9 is the anomalous high pixel value being replaced. Accordingly, adding a fraction of the original pixel value to the replacement pixel value may be used to compensate for the minor second order neighbor pixel cross-talk effects. In various embodiments, any desired fraction (e.g., one sixteenth or other fraction) of P9, P8, or other pixel value or number may be used. In some embodiments, other numbers may be used to calculate the high offset value. Other high value offset calculations may be used in other embodiments as desired.

Turning now to the case of a possible anomalous low pixel value, in block 460, logic device 110 compares the pixel value of center pixel 360 with the lower limit pixel value determined in block 430. In this regard, if center pixel 360 has a pixel value less than or equal to the lower limit pixel value (e.g., P1 in the case of lower limit pixel value 520A, P3 in the case of lower limit pixel value 520B, or other lower limits that may be selected), then center pixel 360 is preliminarily identified as a possible anomalous low pixel value and the process continues to block 465. Otherwise, the process continues to block 480.

In various embodiments, the determination of an anomalous low pixel value can be further performed through the use of a dark pixel threshold (e.g., distinguishable from the lower limit pixel value previously discussed herein). In this regard, the dark pixel threshold may be an adjustable threshold that is used as a further check to determine whether center pixel 360 exhibits an anomalous low pixel value.

Accordingly, in block 465, logic device 110 compares the difference previously determined in block 443 (e.g., the between the pixel value of center pixel 360 and the median pixel value P5) with a dark pixel threshold. In this regard, it will be appreciated that if the pixel value of center pixel 360 greatly deviates from the median pixel value P5 (e.g., their difference exceeds the dark pixel threshold), then it is likely to be anomalous and the process continues to block 470. Conversely, if the pixel value of center pixel 360 is close to the median pixel value P5 (e.g., their difference is less than the dark pixel threshold), then it is unlikely to be anomalous and the process continues to block 480.

Upon reaching block 470, logic device 110 will have determined that center pixel 360 is indeed an anomalous low pixel value (e.g., as a result of the determinations performed in blocks 460 and 465). Accordingly, in block 470, logic device calculates a replacement pixel value for center pixel 360. In this case, logic device 110 may use the median pixel value P5 determined in block 425 and may further include a low value offset as set forth in the following equation 7:

$$\text{replacement pixel value} = (\text{median pixel value } P5) + (\text{low value offset}) \quad \text{(eq. 7)}$$

The use of median pixel value P5 in equation 7 can be particularly useful when replacing anomalous low pixel values. In this regard, anomalous low pixel values may be less noticeable in some image frames and using the median pixel value P5 may result in acceptable image quality in such cases. In addition, the use of median pixel value P5 may be particularly useful in cases where the pixel values of kernel 310 are distributed in a substantially uniform manner as discussed.

Although block 470 has been discussed with regard to using median pixel value P5, other techniques may be used as appropriate. For example, in some embodiments, the average of any neighbor pixel values may be used calculate the replacement pixel value as discussed with regard to block 455.

As set forth in equation 7, a low value offset may be added to the replacement pixel value. This can be provided to compensate for cross-talk effects that may be present in any of the neighbor pixels. In some embodiments, the low value offset may be a fraction of the highest pixel value P9 of kernel 310 and/or other techniques as discussed with regard to block 455. In some embodiments, different high value offsets and low value offsets may be used in blocks 455 and 470, respectively.

In block 475, logic device 110 replaces the pixel value of center pixel 360 with the replacement value determined in block 455 or block 470. Otherwise, if no anomalous pixel was detected, in block 480 logic device 110 makes no change in the pixel value of center pixel 360 (e.g., the original pixel value is retained).

In block 485, if additional pixels 305 of image frame 300 remain to be processed (e.g., in various embodiments, all pixels 305 or only a subset of pixels 305 are processed in the iterations of various blocks of FIG. 4), then the process returns to block 410. In this regard, it will be appreciated that the processing of the remaining pixels 305 will be performed using the original pixel values of image frame 300 (e.g., not the replaced pixel values). After all pixels 305 have been processed, then image frame 300 will be updated with the replacement pixel values and the process continues to block 490.

In block 490, one or more of blocks 405 to 485 may be repeated to perform one or more additional iterations of anomalous pixel processing on the updated (e.g., processed) image frame 300 after the anomalous pixel values have been replaced. As a result, additional anomalous pixels may be detected and replaced as appropriate (e.g., anomalous pixels that were not the most extreme anomalous pixel values in a previous iteration of blocks 405 to 485).

Thus, following the process of FIG. 4, image frame 300 may exhibit improved image quality with less anomalous pixel values present.

Figure 6:
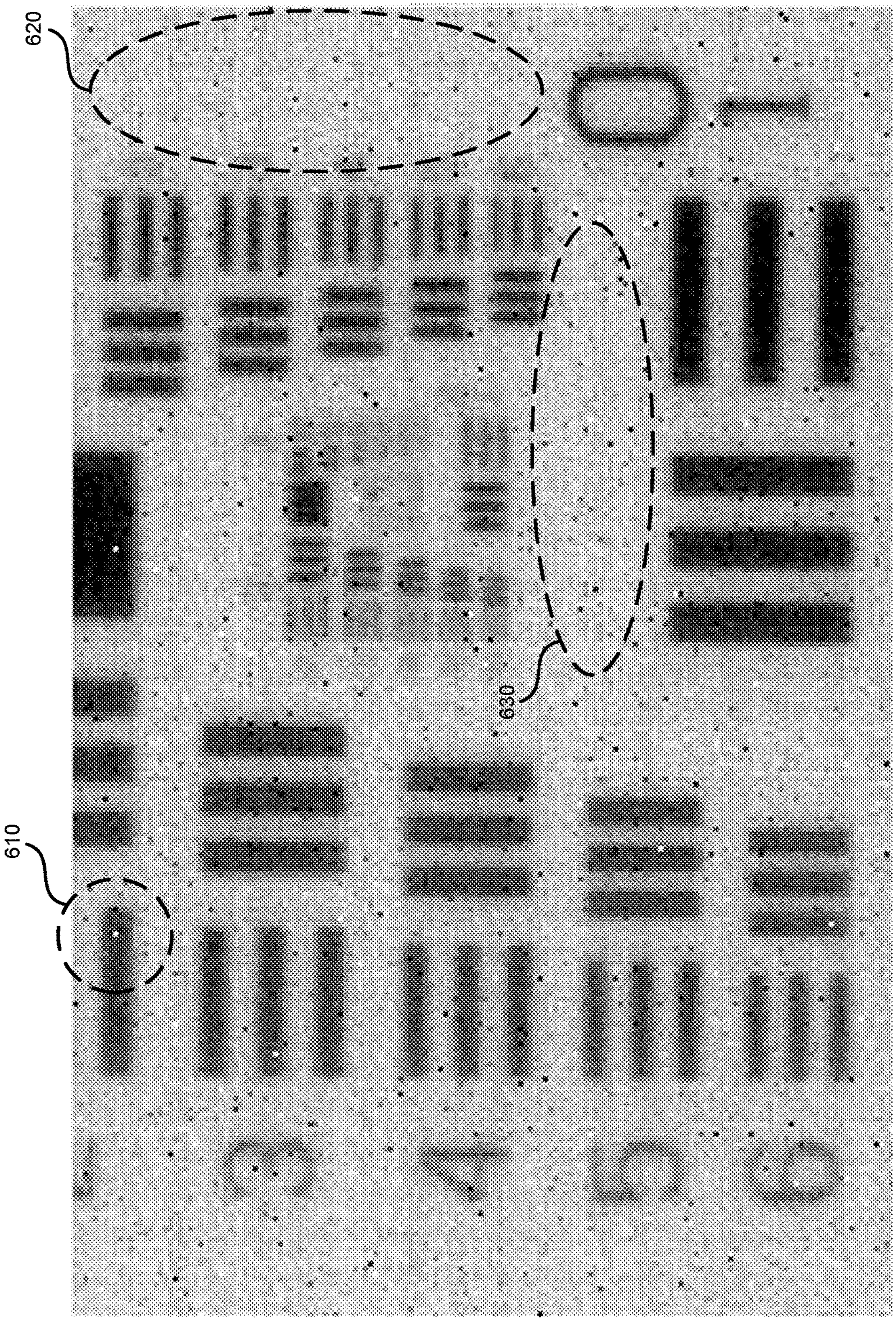
FIG. 6 illustrates an image frame before anomalous pixel processing is performed in accordance with an embodiment of the present disclosure.
Figure 7:
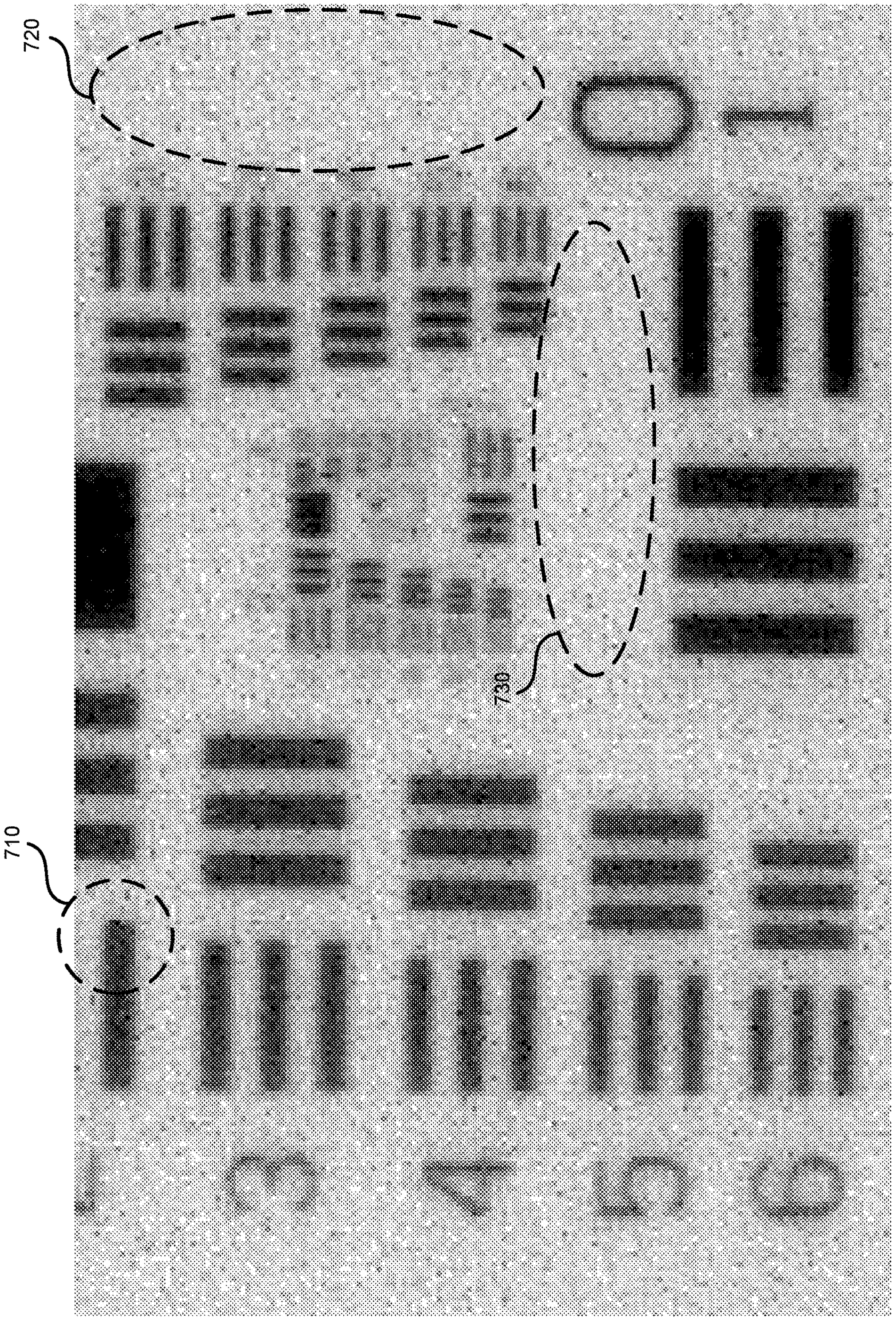
FIG. 7 illustrates an image frame after anomalous pixel processing is performed in accordance with an embodiment of the present disclosure.

For example, FIG. 6 illustrates an original image frame 600 before the process of FIG. 4 has been performed and FIG. 7 illustrates a processed image frame 700 after the process of FIG. 4 has been performed in accordance with embodiments of the present disclosure.

As shown, original image frame 600 exhibits various anomalous high and low pixel values in regions 610, 620, and 630, among others. In contrast, processed image frame 700 exhibits greatly reduced anomalous high and low pixel values in corresponding regions 710, 720, and 730, among others. Moreover, processed image frame 700 does not exhibit any noticeable artifacts resulting from the pixel value replacement performed by the process of FIG. 4.

Other embodiments are also contemplated. For example, returning to the discussion of bright and dark pixel thresholds, it will be appreciated that setting the bright or dark pixel thresholds to high values will result in fewer anomalous pixels being detected (e.g. less aggressive pixel value replacement), whereas setting the bright or dark pixel thresholds to low values will result in more anomalous pixels being detected (e.g. more aggressive pixel value replacement).

In some embodiments, the bright and dark pixel thresholds may be different from each other. For example, in some embodiments, the dark pixel threshold may be one third of the bright pixel threshold. However, other values may be used as appropriate.

In some embodiments, the bright and dark pixel thresholds may be adjusted (e.g., in block 444, block 450, block 465, and/or elsewhere as appropriate) to perform a desired number of pixel value replacements per image frame 300 as may be desired (e.g., different values may be used to account for the different anomalous pixel behavior associated with different image capture components 130).

For example, in some embodiments, the bright and dark pixel thresholds may be adjusted dynamically in real-time (e.g., floating). In this regard, logic device 110 may maintain a count of the number of pixel values that have been replaced in image frame 300 and compare it to a desired range of minimum and maximum number of pixel values to be replaced in each image frame.

For example, if the number of replaced pixel values (replaced count) is less than a desired minimum number of replaced pixel values (minimum count), then the threshold may be adjusted as set forth in the following equation 8:

$$\text{adjusted threshold} = (\text{current threshold}) \times [(\text{replaced count})/(\text{minimum count})] \quad \text{(eq. 8)}$$

If the number of replaced pixel values (replaced count) is greater than a desired maximum number of replaced pixel values (maximum count), then the threshold may be adjusted as set forth in the following equation 9:

$$\text{adjusted threshold} = (\text{current threshold}) \times [(\text{replaced count})/(\text{maximum count})] \quad \text{(eq. 9)}$$

In some embodiments, different desired maximum numbers of replaced high pixel values and low pixel values may be used to adjust the threshold.

In some embodiments, to reduce possible flickering of pixel values (e.g., resulting from rapid adjustment of the threshold), a damping factor (damp) may be applied to the threshold as set forth in the following equation 10 (e.g., in some embodiments a damping factor of 0.75 may be used, but other values are also contemplated):

$$\text{current threshold} = (\text{damp}) \times (\text{current threshold}) + (1 - \text{damp}) \times (\text{adjusted threshold}) \quad \text{(eq. 10)}$$

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:

receiving an image frame comprising a plurality of pixels having associated pixel values;

selecting a kernel of the plurality of pixels comprising a center pixel and a plurality of neighbor pixels; and if the center pixel value exhibits a first anomalous pixel condition, calculating a first replacement pixel value using a gradient associated with at least a subset of pixel values of the plurality of the neighbor pixels; and if the center pixel value exhibits a second anomalous pixel condition different from the first anomalous pixel condition, calculating a second replacement pixel value using a median pixel value of the kernel.

2. The method of claim 1, wherein the gradient is a smallest gradient associated with pixel values of second order neighbor pixels of the kernel.

3. The method of claim 1, wherein:
the first replacement pixel value is an average of the subset of pixel values.

4. The method of claim 3, wherein:
the first anomalous pixel condition is an anomalous high pixel value; and
the second anomalous pixel condition is an anomalous low pixel value.

5. The method of claim 1, wherein the subset is a subset of pixel values associated with second order neighbor pixels of the kernel and excludes pixel values of first order neighbor pixels of the kernel.

6. The method of claim 1, further comprising:
calculating a difference between the center pixel value and the median pixel value of the kernel;
comparing the difference with a first threshold to detect the first anomalous pixel condition;
comparing the difference with a second threshold to detect the second anomalous pixel condition; and
adjusting the first threshold and the second threshold in response to a number of the pixel values replaced in the image frame.

7. The method of claim 1, wherein:
the calculating the first replacement pixel value further comprises adding a first offset to compensate for cross-talk among the center pixel and one or more of the neighbor pixels; and
the calculating the second replacement pixel value further comprises adding a second offset to compensate for the cross-talk.

8. The method of claim 1, further comprising:
performing the selecting and the calculating for a plurality of kernels of the image frame;
replacing the center pixel values of the plurality of kernels of the image frame with the replacement pixel values to provide a processed image frame; and
repeating the selecting and the calculating for a plurality of kernels of the processed image frame.

9. The method of claim 1, wherein:
the image frame is a thermal image frame; and
the kernel is a 3 pixel by 3 pixel kernel.

10. The method of claim 1, further comprising:
sorting the pixel values of the kernel;
selecting a first pixel value limit from the sorted pixel values;
selecting a second pixel value limit from the sorted pixel values;
comparing the center pixel value with the first pixel value limit to detect the first anomalous pixel condition; and
comparing the center pixel value with the second pixel value limit to detect the second anomalous pixel condition.

11. A method comprising:
receiving an image frame comprising a plurality of pixels having associated pixel values;
selecting a kernel of the plurality of pixels comprising a center pixel and a plurality of neighbor pixels;
sorting the pixel values of the kernel;
selecting a pixel value limit from the sorted pixel values; and
comparing the center pixel value with the pixel value limit to detect an anomalous pixel condition;
if the center pixel value exhibits the anomalous pixel condition, calculating a replacement pixel value using a gradient associated with at least a subset of pixel values of the plurality of the neighbor pixels.

12. A system comprising:
a logic device configured to:
receive an image frame comprising a plurality of pixels having associated pixel values;
select a kernel of the plurality of pixels comprising a center pixel and a plurality of neighbor pixels;
if the center pixel value exhibits an anomalous pixel condition, calculate a replacement pixel value using a gradient associated with at least a subset of pixel values of the plurality of the neighbor pixels;
perform the select and the calculate for a plurality of kernels of the image frame;
replace the center pixel values of the plurality of kernels of the image frame with the replacement pixel values to provide a processed image frame; and
repeat the select and the calculate for a plurality of kernels of the processed image frame.

13. The system of claim 12, wherein the gradient is a smallest gradient associated with pixel values of second order neighbor pixels of the kernel.

14. The system of claim 12, wherein:
the anomalous pixel condition is a first anomalous pixel condition;
the replacement pixel value is a first replacement pixel value and an average of the subset of pixel values; and
the logic device is configured to calculate a second replacement pixel value using a median pixel value of the kernel if the center pixel value exhibits a second anomalous pixel condition.

15. The system of claim 14, wherein:
the first anomalous pixel condition is an anomalous high pixel value; and
the second anomalous pixel condition is an anomalous low pixel value.

16. The system of claim 12, wherein the subset is a subset of pixel values associated with second order neighbor pixels of the kernel and excludes pixel values of first order neighbor pixels of the kernel.

17. The system of claim 12, wherein the logic device is configured to:
sort the pixel values of the kernel;
select a pixel value limit from the sorted pixel values; and
compare the center pixel value with the pixel value limit to detect the anomalous pixel condition.

18. The system of claim 12, wherein the logic device is configured to:
calculate a difference between the center pixel value and a median pixel value of the kernel;
compare the difference with a threshold to detect the anomalous pixel condition; and
adjust the threshold in response to a number of the pixel values replaced in the image frame.

19. The system of claim 12, wherein the logic device is configured to add an offset to the replacement pixel value to compensate for cross-talk among the center pixel and one or more of the neighbor pixels.

20. The system of claim 12, further comprising:
a thermal imager configured to capture the image frame;
wherein the image frame is a thermal image frame; and
wherein the kernel is a 3 pixel by 3 pixel kernel.

* * * * *